United States Patent [19]
Bohle

[11] 3,885,988
[45] May 27, 1975

[54] METHOD AND APPARATUS FOR FILLING ADJACENT INSULATING TUBES FORMING THE POSITIVE PLATE OF A LEAD-ACID STORAGE BATTERY

[76] Inventor: Lorenz Bohle, Gerhardt-Hauptmann-Str. 9, 4415 Westkirchen, Germany

[22] Filed: Oct. 4, 1973

[21] Appl. No.: 403,540

[52] U.S. Cl. .................. 136/27; 136/67; 141/32
[51] Int. Cl. .......................................... H01m 35/26
[58] Field of Search ............ 136/67, 66, 43, 53, 55, 136/62, 63, 35, 75, 26, 27; 141/32

[56] References Cited
UNITED STATES PATENTS

| | | | |
|---|---|---|---|
| 417,088 | 12/1889 | Pumpelly | 136/67 |
| 1,101,968 | 6/1914 | Smith | 136/67 |
| 1,303,513 | 5/1919 | Spencer | 136/67 |
| 2,305,121 | 12/1942 | Wheat | 136/55 |
| 3,080,616 | 3/1963 | Jmamura | 136/55 |
| 3,228,796 | 1/1966 | Barak et al. | 136/67 |

Primary Examiner—Anthony Skapars
Attorney, Agent, or Firm—Fitch, Even, Tabin & Luedeka

[57] ABSTRACT

A method and apparatus are described for filling the adjacent insulating tubes which form the positive plate of a lead-acid storage battery, wherein supplementary water is added to a paste-like mixture comprising one or more oxides of lead, sulphuric and water, the supplementary water being added in an amount sufficient to reduce the dynamic viscosity of the paste-like mixture and to form a suspension, and wherein the suspension is forced into the tubes within a period of time which does not allow the water to separate from the suspension.

6 Claims, 6 Drawing Figures

METHOD AND APPARATUS FOR FILLING ADJACENT INSULATING TUBES FORMING THE POSITIVE PLATE OF A LEAD-ACID STORAGE BATTERY

This invention relates to a method of filling the adjacent insulating tubes which form the positive plate (also known as an "ironclad" plate) of a lead-acid storage battery. The tubes are arranged adjacent one another and are permeable to the electrolyte of the battery. Each tube concentrically encloses a lead spine which carries one or more spacers to locate the spine within its tube and the spines are electrically interconnected to form the positive pole of the battery. The invention also relates to apparatus for performing the method.

A previously proposed method of filling the tubes of ironclad plates in lead-acid storage batteries with lead oxides, was by shaking a dust comprising lead oxides into the narrow gap between the lead spine and the tube. Disadvantages of this method are that firstly the tube is non-uniformly filled, secondly that the use of a lead-containing dust is a hazard to health, and finally that the performance of such lead-acid batteries is unsatisfactory.

It is an object of the present invention to provide a method which will enable lead-acid storage batteries to be more economically and more quickly produced than hitherto, which will eliminate the health hazard and permit expensive means of protecting personnel to be dispensed with; which can be performed automatically; and which will permit the lead oxides to be controllably introduced in correct proportions into the tubes containing spines filling even the narrowest gaps between the spines and the tubes.

The apparatus according to the invention is simpler than the previously used vibrating means, less liable to develop faults and, more particularly, more economical in operation.

According to one aspect of the present invention there is provided a method of filling the adjacent insulating tubes which form the positive plate of a lead-acid storage battery, wherein supplementary water is added to a paste-like mixture comprising one or more oxides of lead, sulphuric and water, such paste-like mixture corresponding to the paste used for motor vehicle starter batteries, the supplementary water being added in an amount sufficient to reduce the dynamic viscosity of the paste-like mixture, and to form a suspension, and wherein the suspension is forced into the tubes within a period of time which does not allow water to separate from suspension, the volume of suspension forced into the tubes being equivalent to the capacity of the tubes for the volume of said paste-like mixture required to operate the battery plus the volume of supplementary water apportionable to said volume of paste-like mixture.

Preferably the dynamic viscosity of the paste is reduced to from 3,000 to 4,000 centipoises and any supplementary water is allowed to squeeze out as the suspension is forced into the tubes, any remaining supplementary water is replaced when the plates are immersed in acid for charging or forming.

The strength of the acid in the forming vats, when the batteries are charged for the first time, must be suitably adjusted to ensure that the required acid concentration is established after allowing for the expelled supplementary water.

In a preferred embodiment of the present method, the mixture of paste and supplementary water is injected into the tubes at a substantially uniform rate and within a period of time less than 1.5 seconds.

At the above specified dynamic viscosity, the paste is sufficiently mobile to be capable of being forced into the smallest gaps between the lead spine and the tube without interfering with the packing uniformity of the paste and without affecting the properties of the paste.

According to another aspect of the present invention there is provided apparatus for performing the present method, comprising a preparatory processing vessel for preparing said suspension, a metering pump associated therewith and located directly below and connected to the vessel through an interposed screen, a gate or valve element which is arranged abruptly to open a distributor provided with a plurality of nozzle openings which can be fitted over or inserted into the ends of said tubes and means for holding the tubes that are to be filled.

The present method affords a major technical advantage in that a tolerance of ± 1 percent in weight can be maintained when filling the tubes, so that the fillings may be regarded as being homogeneous, and that the expelled supplementary water wets the surfaces of the tubes in the form of droplets which permit an easy visual check of the filling level in each tube.

An advantage of the present method is that any voids left in the tubes can be readily detected by the emergence of too much water or of the paste and water mixture. Thus, in general, the production of tubular plates which are free from faults is possible.

The suspension of supplementary water and the paste-like active material which is prepared for injection into each tube has a volume which under normal conditions exceeds the available capacity of the tube. The supplementary water emerges from the tube through pores in the walls of the tube and at the same time subjects the tube to a temporary expansion which is relieved when the supplementary water is replaced during formation in an acid solution.

This replacement gives rise to a fine porosity, which results in improved performance and longer life of the ironclad plate.

An increase in the water content of a conventional paste-like active material, as used for instance in motor vehicle starter batteries, renders the paste so mobile that it can penetrate the small annular slits in the ironclad plates of a storage battery which is to be used for continuous discharge, for instance in fork lift trucks. Furthermore a higher water content prior to injection of the paste-like active material into the tubes, produces a lead-acid battery of substantially better properties than those possessed by a conventional lead-acid battery. More particularly, by adjusting the quantity of the supplementary water it is possible to alter the density of the paste-like active material inside the tube containing a lead spine and thereby to adjust the life/performance ratio of the lead-acid battery. Surprisingly, the present invention permits the life/performance ratio to be controlled simply by suitably proportioning the water addition.

A storage battery has a longer life, but a lower performance, when the lead content is higher, and conversely a higher performance and a shorter life when the density of the lead-containing active material is lower.

The present method permits lead oxides to be introduced into the ironclad plates of storage batteries in the form of a paste, i.e., in the form of a mixture of lead oxides, sulphuric acid and water, instead of in the form of a dust comprising lead oxides.

The quantity of supplementary water needed to reduce the viscosity of the paste-like active material for filling the tubes, above the water content of a conventional active paste for starter batteries, does not result in an inferior lead-acid battery as was hitherto believed, but enables the above-mentioned density adjustment of the lead oxides in the tubes to be achieved.

Some of the supplementary water which causes the paste-like active material to be present in the form of a suspension issues in the form of very fine droplets from the porous walls of the tube to be filled with lead oxides and any supplementary water not exuded is replaced by acid as soon as the ironclad plates are immersed in acid for the first time, the acid strength changing according to the state of charge on the said plates. The concentration of the acid is changed only insignificantly, and this change in acid concentration can be easily compensated for by a slight initial excess in the concentration of the acid.

For the purposes of the present method only an exactly proportioned volume of supplementary water and paste-like active material is forced into the tubes. The tubes can temporarily expand to accommodate the additional volume represented by the supplementary water contained in the paste-like active material and not expelled through the pores of the tube wall. It is important that the suspension is injected uniformly at a high velocity without being deflected, so as to keep the suspension mobile and to prevent the paste-like active material and the water from separating during the process of filling.

To enable the invention to be more readily understood, reference will now be made to the accompanying drawings, which illustrate diagrammatically and by way of example, an embodiment of the invention and in which.

Figure 1:
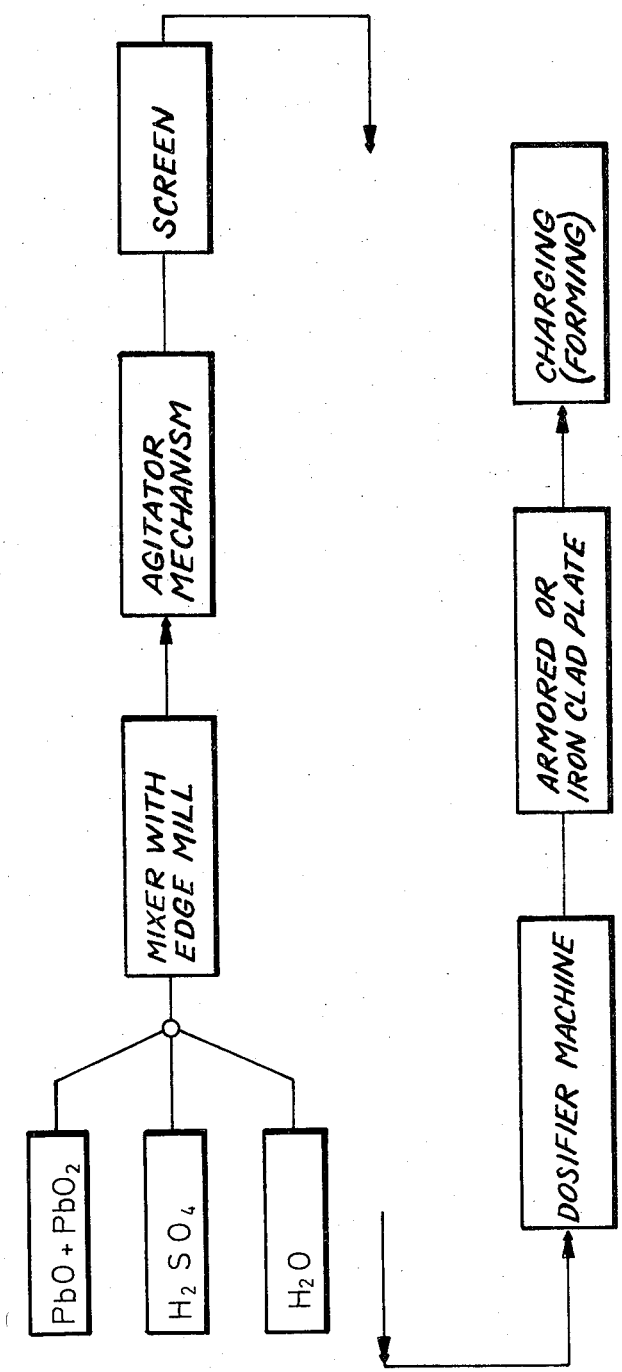
FIG. 1 is a flow diagram illustrating the present method.

Referring to FIG. 1, lead oxide and/or red lead, e.g. in dust or powder form, and sulphuric acid and water in conventional proportions for the production of a paste-like active material for the positive plates of starter batteries, together with a supplementary volume of water chosen in accordance with the desired density of the lead oxides in the battery, are placed into a mixer comprising a pan crusher which serves as a preparatory processing vessel. For the preparation of a suspension, the supplementary water required may be equal to the amount of water normally used in the preparation of the paste-like active material for motor vehicle starter batteries.

The suspension prepared in the processing vessel is maintained as an even suspension by continuous agitation. Through a stirrer and a screen, the suspension enters a proportioning device which functions as a metering pump. The screen ensures that only a sufficiently mixed suspension can enter the metering pump, and hence the tubes of the plate. The metering pump forces an adjustable volume of the suspension, suitable for the capacities of the tubes into a distributor which injects it into the tubes of the ironclad plate. In order to avoid changes in the feed rate, changes in the cross-section of flow through the distributor are preferably avoided. The actual process of injection of the suspension preferably proceeds in under 1.5 seconds, for example in 1 second, and hence fast enough to prevent separation of the supplementary water from the paste-like active material and to maintain the mobility of the active paste. In order to take up the thrust generated during the process of injection the rear ends of the tubes are supported by holders. When the ironclad plate has been filled, forming takes place immediately in a conventional manner.

The present method is particularly suitable for automation.

In order to ensure a rapid and uniform injection of the suspension into the tubes, an abruptly opening gate or valve is provided on the delivery side of the pump. This may be in the form of a pneumatically or hydraulically operable gate valve. The suspension is preferably fed from the metering pump to the tubes in a direction which is axially parallel to the axes of the lead spines in the tubes to prevent segregation in the suspension by a change in direction. The direction of movement of the plunger of the metering pump also aligns with the tubes.

In order to ensure that the metering pump itself is evenly filled, it is desirable to locate the mixing and/or processing vessel directly above the metering pump.

Figure 2:
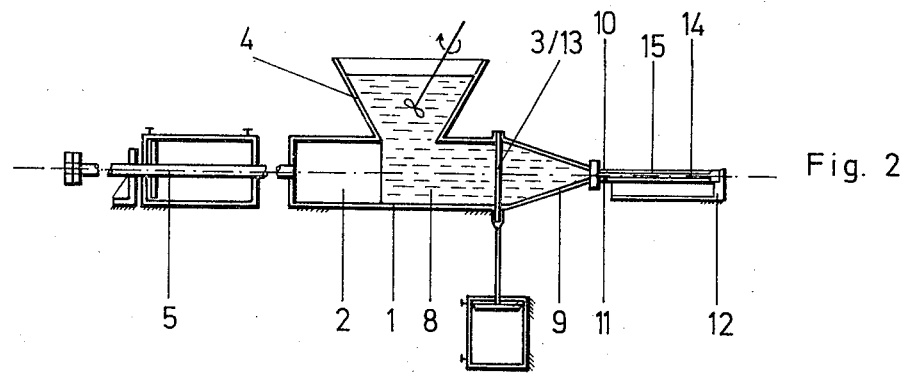
FIG. 2 is a schematic sectional side elevation of apparatus for performing the present method.
Figure 3:
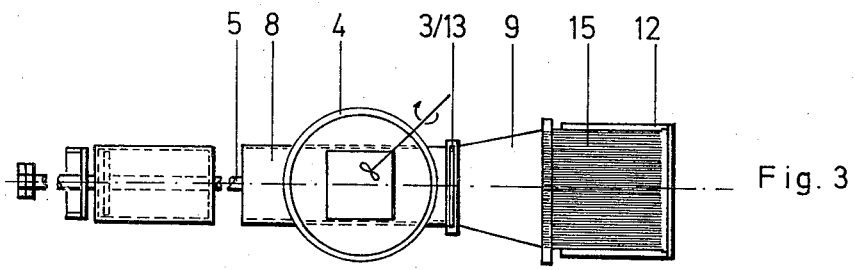
FIG. 3 is a top plan view of the apparatus shown in FIG. 2.
Figure 4:
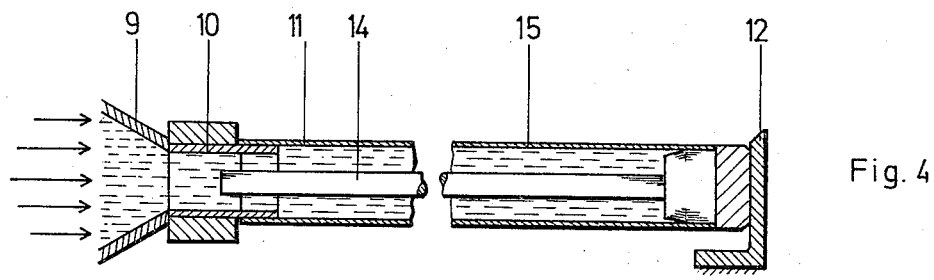
FIG. 4 is a section of a tube in a battery, as well as of a nozzle for injecting a suspension under pressure into the tube.

Referring now to FIGS. 2 to 4, there is shown apparatus for filling the tubes, the apparatus including a metering pump 8 the delivery end of which is directly coupled to a distributor 9 which, as shown in the drawings changes from a round cross-section at its entry end into an elongated cross-section without changing the cross-sectional area. The cross-section at the outlet end of the distributor 9 contains a plurality of nozzles 10 forming spigots for the reception of the ends 11 of tubes 15 of the ironclad plate.

A valve member 13 or gate 3 is interposed between the distributor 9 and the metering pump 8 and enables communication to be abruptly established between pump and distributor without causing a constriction in the cross-section of flow.

The ends 11 of the tubes 15 could be fitted into or onto the nozzles 10. Moreoover, the nozzles themselves could be used to support lead spines 14 during the process of injection.

The tubes 15 are firmly attached to suitable holding means 12 during injection.

For instance 15 adjacent tubes in a plate may be filled simultaneously. As already noted, the injection process takes less than 1.5 seconds. Since the filled tubes can be automatically replaced by empty tubes by mechanical means, it is possible to fill at least 5,000, and possibly more, tubes per hour.

Figure 5:
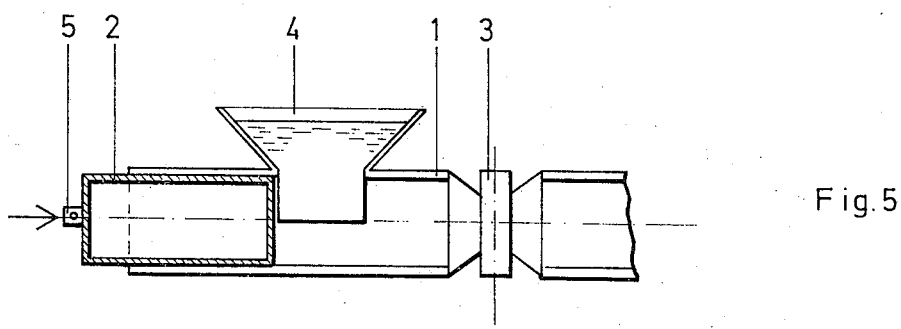
FIG. 5 is a schematic representation of a plunger type metering pump used in the apparatus shown in FIG. 2.
Figure 6:
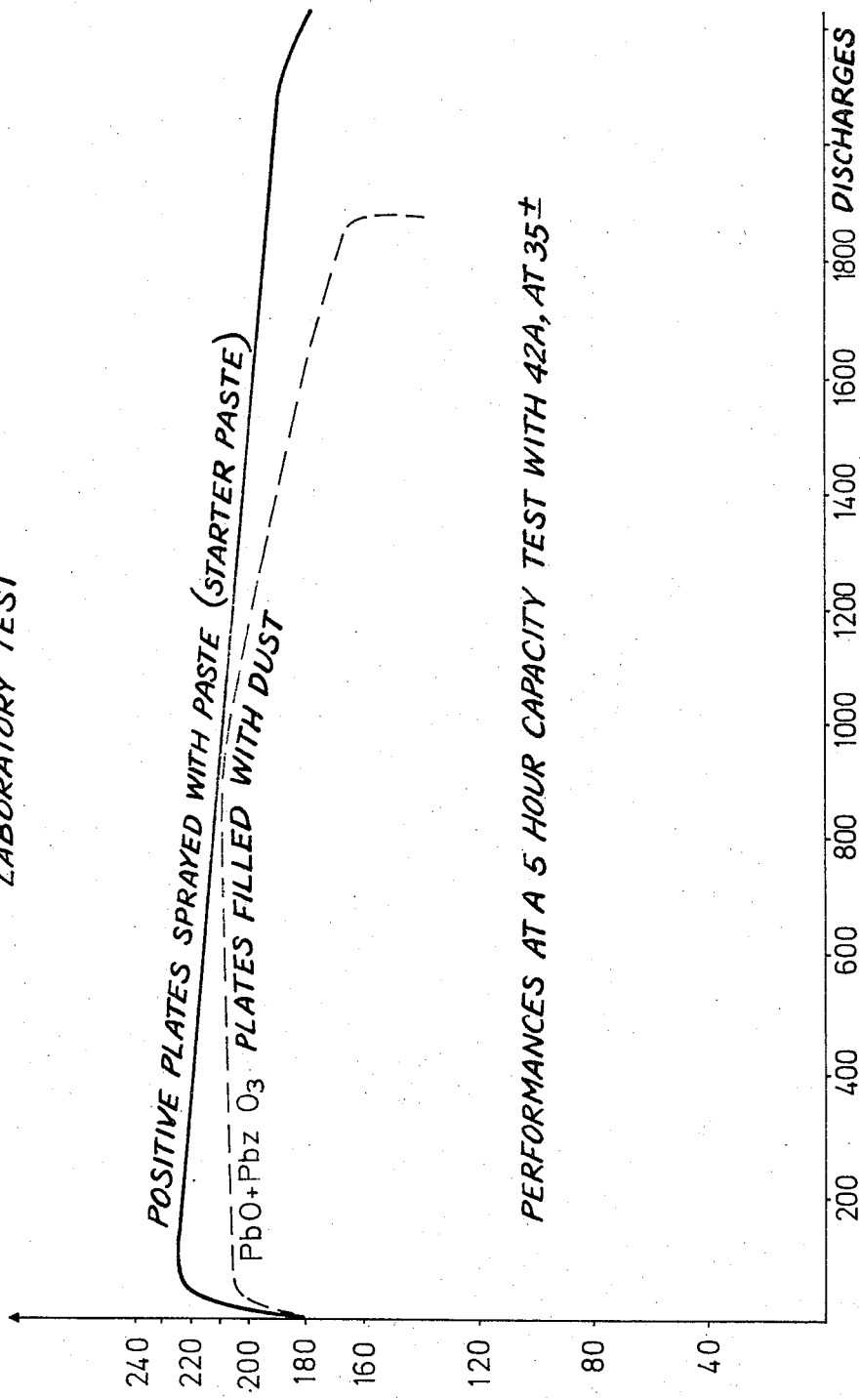
FIG. 6 is a graphical representation of battery performances comparing conventional dust filled plates and paste filled plates filled by the apparatus of the present invention.

FIG. 5 illustratively shows a metering pump in more detail. A plunger 2, made of steel and lacking sealing rings, is axially reciprocable by a piston rod 5 inside a gun metal cylinder. After supply from a feed bin 4 has been cut off, and the gate 3 has been opened, a filling corresponding to a column of length L 2 and diameter D is forced into the tubes that have been coupled to the distributor. During the ensuing retraction of the plunger 2 a fresh volume of suspension is drawn into the cylinder as the plunger traverses the distance L 1. After a fresh set of empty tubes has been coupled up, the cycle can be repeated.

Another feature according to the invention is that the proportioning operation may be performed with an additional gate valve interposed between the preparatory processing vessel and the metering pump 8. This facilitates adjusting the volume the metering pump will deliver.

The active paste used for filling the tubes is in principle similar to that used for the positive electrodes (plates) of starter batteries and can be produced according to known specifications from lead oxides in powder form, sulphuric acid and water. The quantity of supplementary water used can be adjusted to achieve the desired density of the active material inside the tube.

A suitable composition of the suspension could be, for example, as follows:

750 kg. of lead oxide dust (PbO),
250 kg. of red lead ($Pb_3O_4$),
60 kg. of sulphuric acid, $d = 1.4$,
144 kg. of water to yield a paste of density $\gamma = 4.4$ kg./dm$^3$. To this paste are added 145 kg. of supplementary water to form the suspension, i.e., the mixture according to the invention.

Another satisfactory mixture could contain 1000 kg. of lead oxide dust (PbO),
77 kg. of sulphuric acid, $d = 1.4$,
130 kg. of water as a starter paste. For forming the mixture according to the invention there are added another 151 kg. of water to dilute the paste so that it is injectable, the resulting density being $\gamma = 3.2$ kg./dm$^3$.

The total water content is then 281 kg.

What I claim is:

1. A method of filling a plurality of adjacent porous tubes of a lead acid storage battery with a paste-like mixture having lead oxide therein comprising the steps of:

adding supplementary water to the paste-like mixture to reduce the viscosity to form a suspension of a reduced viscosity with the water serving as a carrier for the paste, injecting the suspension under pressure into the tubes quickly before the supplementary carrier water separates from the suspension and in sufficient quantity to provide the predetermined volume of paste for the battery tubes, and separating the supplementary water from the paste-like mixture and from the suspension.

2. A method according to claim 1 including the further step of reducing the viscosity of the suspension when adding supplementary water to 3,000 to 4,000 cP.

3. A method in accordance with claim 1 in which the step of separating the supplementary water comprises exuding supplementary water out through the porous tube walls.

4. A method in accordance with claim 1 including the further step of replacing the supplementary water when adding acid for charging.

5. A method in accordance with claim 1 including the further step of injecting the suspension within the period of time of less than 1.5 seconds and at a substantially uniform rate.

6. A method in accordance with claim 1 including the step of mixing the suspension immediately prior to quickly injecting to prevent the suspension from separating from the carrier water.

* * * * *